United States Patent [19]

Bankier

[11] Patent Number: 4,635,797
[45] Date of Patent: Jan. 13, 1987

[54] PILFER RESISTANT SOFTWARE PACKAGE

[75] Inventor: Jack D. Bankier, Northbrook, Ill.

[73] Assignee: Bankier Companies, Inc., Northbrook, Ill.

[21] Appl. No.: 813,469

[22] Filed: Dec. 26, 1985

[51] Int. Cl.⁴ .............................................. B65D 73/00
[52] U.S. Cl. ................................... 206/472; 206/312; 206/387; 206/425; 206/444; 206/486; 206/621; 206/626; 220/337; 220/339
[58] Field of Search ................. 206/37, 216, 311, 312, 206/387, 425, 444, 450, 459, 472, 473, 474, 475, 486, 612, 621, 626, 807, 461, 470; 220/334, 337, 339

[56] References Cited

U.S. PATENT DOCUMENTS

| | | | |
|---|---|---|---|
| 2,931,557 | 4/1960 | Loderhose | 206/312 |
| 3,641,684 | 2/1972 | Paige | 206/387 |
| 3,743,081 | 7/1973 | Roberg et al. | 206/387 |
| 3,755,925 | 9/1973 | Court | 206/232 |
| 3,896,929 | 7/1975 | Mills | 206/387 |
| 3,926,234 | 12/1975 | Dean | 206/37 |
| 4,002,355 | 1/1977 | Sendor | 206/472 |
| 4,132,311 | 1/1979 | Glinert | 206/387 |
| 4,158,412 | 6/1979 | Wysocki | 206/612 |
| 4,209,095 | 6/1980 | Dutcher | 206/621 |
| 4,300,682 | 11/1981 | Kuchenbecker | 206/621 |
| 4,322,001 | 3/1982 | Hurley | 206/459 |
| 4,327,831 | 5/1982 | Inaba et al. | 206/444 |
| 4,353,460 | 10/1982 | Kahn | 206/612 |
| 4,407,410 | 10/1983 | Graetz et al. | 206/387 |
| 4,432,827 | 2/1984 | Graetz et al. | 206/387 |
| 4,508,366 | 4/1985 | Brindle | 206/444 |
| 4,511,034 | 4/1985 | Pan | 206/444 |
| 4,518,275 | 5/1985 | Rauch, III et al. | 206/387 |
| 4,549,658 | 10/1985 | Sfikas | 206/444 |
| 4,566,590 | 1/1986 | Manning et al. | 206/387 |

FOREIGN PATENT DOCUMENTS

| | | | |
|---|---|---|---|
| 1169389 | 6/1984 | Canada | 206/387 |
| 3324126 | 1/1985 | Fed. Rep. of Germany | 206/387 |
| 2503667 | 10/1982 | France | 206/387 |
| 2091692 | 8/1982 | United Kingdom | 206/387 |

*Primary Examiner*—William Price
*Assistant Examiner*—David T. Fidei

[57] ABSTRACT

A software package comprises a folded structure including a pair of molded, complemental sheets connected to a hinged base. The sheets have peripheral, complemental stair-step edges for closing the package with complemental, releasable latches. The software is sealed between one of the molded sheets and the base with access thereto being provided by way of a frangible flap, while the related information is either sealed behind the other molded sheet or is at least partially behind the other molded sheet and secured to the base. Both molded sheets are preferably constructed of a clear material for easy viewing by a perspective customer.

11 Claims, 6 Drawing Figures

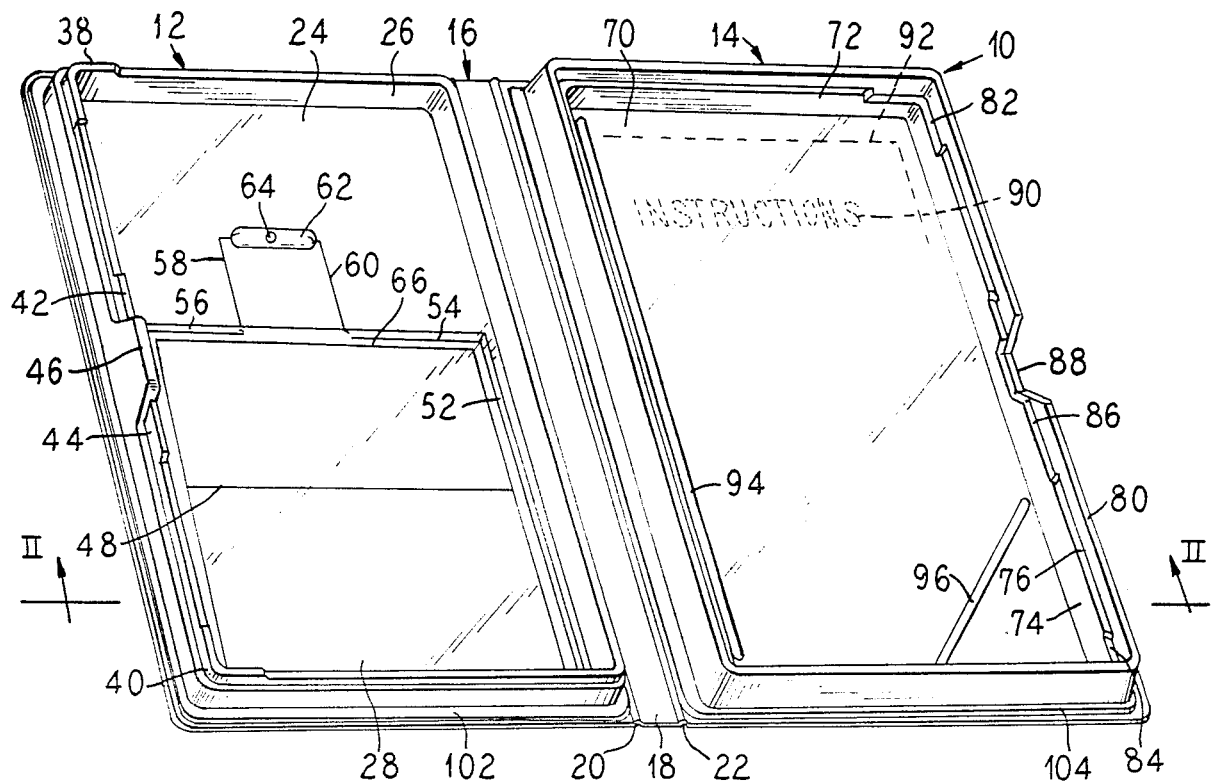

PILFER RESISTANT SOFTWARE PACKAGE

BACKGROUND OF THE INVENTION

The present invention relates to a software package, and more particularly to a pilfer resistant software package for a diskette and for printed instructions concerning the software.

Presently, software is packaged in a variety of ways, including the provision of the stored software medium and any instructions relating thereto in a carton which may be easily opened for viewing by a perspective customer. With such access to the elements of the package, pilferage becomes a problem.

SUMMARY OF THE INVENTION

It is the object of the present invention to provide a software package in which the instructions and related information are easily viewed by a perspective customer, while at the same time the software and its related information are protected against pilferage.

According to the invention, the above object is achieved in a folded software container having a first section housing the software and a second section housing the related information. Both sections share a common base which is preferably a polyvinylchloride (PVC) coated paperboard. Each of the storage sections comprises a molded, preferably clear, PVC cover which is welded to the base by radio frequency (RF) welding.

The first storage section comprises a formed pocket for holding, for example, a diskette structure, and includes a slit extending between a pair of scorings which provide frangible locations whereby the diskette may be removed upon lifting the material at the slit to break the scorings. A molded bubble also extends between the scorings spaced from the slit and acts as a hinge for the flap which is formed after the scorings have been broken. The second storage section comprises a clear sheet having slots therein for a variety of purposes. First of all, simple instructions may be printed on the base for viewing through the clear plastic sheet. As an alternative, a separate printed sheet may be introduced between the base and the clear plastic sheet by way of one of the aforementioned slots. More detailed instructions and related material, in the form of a booklet, may be included when the clear plastic sheet is formed with a recess for receiving the book with its back cover extending through one of the slots. In this latter variation, the back cover may be glued to the base as a guard against pilferage.

According to another feature of the invention, the folded container comprises, for each section, a hollow upstanding peripheral edge shaped to mate with the similar peripheral edge of the other section. One of the sections further comprises at least one projection of the hollow structure to mate with at least one recess of the other hollow structure with the projection and the recess each including resilient bypassing hook walls for releasable engagement as a latch structure for holding the folded container in a closed condition.

BRIEF DESCRIPTION OF THE DRAWING

Other objects, features and advantages of the invention, its organization, construction and operation will be best understood from the following detailed description, taken in conjunction with the accompanying drawing, on which:

FIG. 1 is a perspective view of a software container constructed in accordance with the present invention;

FIG. 2 is a sectional view taken substantially along the line II—II of FIG. 1;

FIG. 3 is a sectional view, again basically along the line II—II of FIG. 1, but showing the container in a closed condition;

FIG. 4 is a perspective view illustrating the first storage section after the software storage pocket has been opened for access to the storage medium;

FIG. 5 is a sectional view taken substantially along the line V—V of FIG. 1; and FIG. 6 is a fragmentary sectional view illustrating the latch condition of the software package in a closed condition.

DESCRIPTION OF THE PREFERRED EMBODIMENTS

Referring to the drawing, a software package constructed in accordance with the present invention is generally illustrated at 10 as comprising a first storage section 12 and a second storage section 14 connected together by a hinge 16. The storage sections 12, 14 share a common base 18 which may comprise, for example, PVC coated paperboard. The hinge 16 comprises a pair of embossments 20 and 22 to facilitate folding of the package in the manner illustrated in FIG. 3.

As best seen in FIGS. 1 and 2, the storage section 12 comprises a molded sheet 24 which includes an upstanding peripheral edge 26 and a, in this case, shallow pocket 28 for holding a diskette structure, hereinafter simply termed diskette. As is known, a diskette comprises a storage disk housed in, conventionally, a paper container and may further include an envelope for the paper container. Of course, with proper dimensioning of the package and pocket, various magnetic tape cassettes and cartridges could be accommodated in the pocket 28.

The peripheral edge 26, as best seen in FIG. 2, comprises a stairstep structure including a pair of walls 30 and 34 and a pair of walls 32 and 36 connecting the walls 30 and 34 and for providing mating to a complemental structure of the storage section 14, as will be set forth below. The peripheral edge 26 also comprises a pair of projections 38 and 40 for the purpose of latching, as will be discussed in connection with FIG. 6, and a plurality of projections 42, 44 and 46 which aid in aligning the stairstep structures when the package is closed.

The pocket 28 comprises a transverse slit 48 (later to form an edge 48') which is connected, so to speak, with a bubble 62 by way of a plurality of scores 50, 52, 54, 56, 58 and 60 (later to form edges 50', 52', 54', 56', 58',60') of which the latter two scores include sections extending into the bubble 62. The bubble 62 also comprises an aperture 64 therethrough. A diskette 66 is located and sealed in the pocket 28. As best seen in FIG. 4, access may be had to the diskette 66 by lifting the, as viewed, upper edge of the slot 48 to break the scores and form a flap 68 which is hinged by the material of the bubble between the scores 58, 60 and the aperture 64. This frangible structure is a deterrent to pilferage.

The storage section 14 is provided for information concerning the software stored in the storage section 12 and comprises a molded sheet, preferably a clear PVC sheet 70 comprising, again, an upstanding peripheral edge 72 having a stairstep configuration. This stairstep configuration is complemental to and cooperable with the stairstep configuration of the edge 26 when the package is folded and comprises a pair of walls 74 and 78 connected by way of a pair of walls 76 and 80. As illustrated in FIG. 3, the wall 36 engages the wall 76 and the wall 32 engages the wall 80 when the package is folded into a closed condition.

The peripheral edge 72 further comprises a pair of recesses 86 and 88 for receiving the projections 42, 44 and 46 when the package is in the closed condition. In addition, the peripheral edge 72 comprises a pair of further recesses 82 and 84 for receiving the latch projections 38 and 40 of the storage section 12. This is best illustrated in FIG. 6 which is a sectional view through either of the combinations 38, 82 or 40, 84, and assumes the latter combination. As seen in FIG. 6, the latches comprise resilient bypassing hooks having oblique hook walls 106, 108 which flex, bypass and latch the package.

Referring again to FIGS. 1 and 2, the storage section 14, as mentioned above, is provided for related printed material. This printed material may be printed directly on the base 18 and viewed through the clear sheet 70 as indicated at 90. Also, a separate printed sheet 92 may be provided and inserted behind the sheet 70 and viewed therethrough. If the related material is more involved, it may take the form of a booklet, as indicated in FIG. 2, having a back cover 98 which is received through the slot 94 in the sheet 70, or a corner of the cover may be inserted through a slot 96. In either case, pilferage is deterred by, for example, gluing the cover 98 to the base 18, as indicated at 100 in FIG. 2.

The molded sheet 24 comprises a peripheral flange 102 and the molded sheet 70 comprises a peripheral flange 104. The molded sheets 24 and 70 may therefore be sealed to the base 18, preferably by RF welding.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A software package comprising:
    a base including a first section, a second section and a hinge between said first and second sections;
    a software structure carried on said first section and software-related material carried on said second section;
    first pocket means covering said software structure and including a peripheral flange sealed to said first section of said base to define a first storage section, and frangible access means for access to said software structure, said first pocket means further comprising a molded sheet including a pocket shaped to receive said software structure, and said frangible access means comprising a flap defined by frangible scores in said molded sheet and including a bubble in said molded sheet having an aperture therethrough;
    second pocket means covering said software related material and including a peripheral flange sealed to said second section of said base to define a second storage section; and
    first and second cooperable latch means carried by said first and second storage sections, respectively, for releasably latching said storage sections together with said first and second pocket means pivoted towards one another.

2. The software package of claim 1, wherein:
    said hinge comprises a pair of parallel embossments in said base adjacent said sealed peripheral flanges.

3. The software package of claim 1, wherein:
    said base comprises a radio frequency weldable material; and
    said first and second pocket means comprise radio frequency weldable material welded to said base at their respective peripheral flanges.

4. The software package of claim 3, wherein:
    said base comprises a polyvinylchloride coated paperboard; and
    said first and second pocket means comprise polyvinylchloride material.

5. The software package of claim 1, wherein:
    said first and second pocket means each comprise a shaped peripheral projection extending away from said base and complemental to one another for mating in the closed condition of said package.

6. The software package of claim 5, wherein:
    each of said shaped peripheral projections comprises walls defining a stairstep structure.

7. The software package of claim 1, wherein:
    said software related information comprises indicia on said base; and
    said second pocket means comprises a transparent section for viewing said indicia.

8. The software package of claim 1, wherein:
    said software-related material comprises a sheet of printed matter; and
    said second pocket means comprises a transparent section for viewing said printed matter.

9. The software package of claim 1, wherein:
    said software-related material comprises a booklet including a rear cover; and
    said second pocket means comprises a slot for receiving at least a portion of said rear cover therethrough to engage said second section of said base.

10. The software package of claim 9, wherein:
    said second storage section comprises glue attaching said rear cover to said first section of said base.

11. The software package of claim 1, wherein:
    said first latch means comprises first hook means;
    said second latch means comprises second hook means for releasably engaging said first hook means; and
    at least one of said hook means comprises resilient material for yieldably bypassing of said first and second latch means.

* * * * *